United States Patent [19]
Bantli et al.

[11] Patent Number: 5,621,571
[45] Date of Patent: Apr. 15, 1997

[54] INTEGRATED RETROREFLECTIVE ELECTRONIC DISPLAY

[75] Inventors: Heinrich Bantli, Stillwater; Thomas I. Bradshaw, Afton; Stephen W. Mohn, St. Paul; Edmund J. Ring, Circle Pines, all of Minn.

[73] Assignee: Minnesota Mining and Manufacturing Company, St. Paul, Minn.

[21] Appl. No.: 196,294

[22] Filed: Feb. 14, 1994

[51] Int. Cl.⁶ .................................................. G02B 5/122
[52] U.S. Cl. ................ 359/529; 359/530; 359/536; 359/533; 340/907; 343/755; 343/767; 343/700 MS
[58] Field of Search ...................................... 340/907, 928; 343/700 MS, 711, 713, 767, 755; 359/515, 529–533, 534–536

[56] References Cited

U.S. PATENT DOCUMENTS

| | | | |
|---|---|---|---|
| 2,407,680 | 9/1946 | Palmquist et al. | 88/82 |
| 3,190,178 | 6/1965 | McKenzie | 88/82 |
| 3,987,455 | 10/1976 | Olyphant, Jr. | 343/829 |
| 3,995,277 | 11/1976 | Olyphant, Jr. | 343/846 |
| 4,001,822 | 1/1977 | Sterzer | 343/6.5 SS |
| 4,025,159 | 5/1977 | McGrath | 350/105 |
| 4,242,686 | 12/1980 | MacTurk | 343/912 |

(List continued on next page.)

FOREIGN PATENT DOCUMENTS

| | | | |
|---|---|---|---|
| 591281 | 1/1988 | Australia | G08B 13/24 |
| 1288497 | 9/1991 | Canada | E01F 9/06 |
| 0170518 | 2/1986 | European Pat. Off. | G02B 5/128 |
| 0299386A2 | 1/1989 | European Pat. Off. | G08G 1/09 |
| 0521846A1 | 7/1991 | European Pat. Off. | G08G 1/0967 |
| 3307123A1 | 6/1984 | Germany | G08G 1/09 |
| 3509965A1 | 9/1986 | Germany | H03J 9/00 |
| 3636258A1 | 4/1988 | Germany | G08G 1/09 |
| 3911916A1 | 5/1990 | Germany | G08G 1/0962 |
| 4142091A1 | 8/1993 | Germany | G08G 1/0962 |
| 6-232619 | 8/1994 | Japan | H01Q 1/32 |
| 916418 | 5/1990 | South Africa | |
| 1360718 | 7/1974 | United Kingdom | H04B 5/00 |
| 2256072 | 11/1992 | United Kingdom | G08G 1/017 |

OTHER PUBLICATIONS

Pozar, "Microstrip Antennas", *Proceedings of the IEEE*, vol. 80, No. 1, pp. 79–91 (Jan. 1992).
Pozar, "Microstrip Antenna Aperture–Coupled to a Microstripline", *Electronics Letters*, vol. 21, No. 2, pp. 49–50, (Jan. 1985).
R. Conti et al., "The Wire Grid Microstrip Antenna", *IEEE Transactions on Antennas and Propagation*, vol. AP-29, No. 1, pp. 157–166 (Jan. 1981).
Miller et al., "A Wide Bandwidth Low Sidelobe Low Profile Microstrip Array Antenna for Communication Applications", *Proceedings of ISAP '89*, pp. 525–528 (No Month).
Wu et al., "Basic Study on See–Through Microstrip Antennas Constructed on a Window Glass", *IEEE*, pp. 499–502 (1992) (No Month).
Sterzer, "An Electronic License Plate for Motor Vehicles", *RCA Review*, vol. 35, pp. 167–175 (Jun. 1974).
Bergan et al., "Electronic license plate technology: automatic vehicle location and identification", *Can. J. Civ. Eng.* 15, pp. 1035–1042, (1988) (No Month).

*Primary Examiner*—James Phan
*Attorney, Agent, or Firm*—Gary L. Griswold; Walter N. Kirn; Kari H. Bartingale

[57] ABSTRACT

An integrated retroreflective data communication display for visual and electromagnetic communication is described. The display may be configured as an integrated retroreflective electronic license plate, with printed visual information, similar to the information printed on traditional license plates, on retroreflective sheeting. An antenna network is integrated within the license plate for electromagnetic communication and may be connected to external electronic modules. The display may also be configured as an integrated retroreflective electronic road sign, also providing visual and electromagnetic information in a unitary structure.

11 Claims, 12 Drawing Sheets

U.S. PATENT DOCUMENTS

| | | | |
|---|---|---|---|
| 4,451,527 | 5/1984 | Olyphant, Jr. | 428/220 |
| 4,511,210 | 4/1985 | Tung et al. | |
| 4,588,258 | 5/1986 | Hoopman | 350/103 |
| 4,664,966 | 5/1987 | Bailey et al. | 428/203 |
| 4,728,962 | 3/1988 | Kitsuda et al. | 343/872 |
| 4,812,854 | 3/1989 | Boan et al. | 343/897 |
| 5,085,918 | 2/1992 | Rajan et al. | 428/195 |
| 5,177,494 | 1/1993 | Dorrie et al. | 343/711 |
| 5,196,846 | 3/1993 | Brockelsby et al. | 340/933 |
| 5,200,851 | 4/1993 | Coderre et al. | 359/351 |
| 5,204,675 | 4/1993 | Sekine | 340/933 |

INTEGRATED RETROREFLECTIVE ELECTRONIC DISPLAY

FIELD OF THE INVENTION

This invention relates generally to electronic license plates and electronic signs for use in electronic vehicular identification and communication systems as well as in vehicle to roadside or vehicle to vehicle communication systems. More specifically, this invention relates to an integrated retroreflective electronic license plate that provides improved presentation of visual information in conjunction with electronic information in a unitary structure. Also, this invention relates to an integrated retroreflective electronic sign with similar properties.

BACKGROUND OF THE INVENTION

With the ever increasing volume of traffic on roadways, there is a need for more efficient and safer traffic management. The need for local, unidirectional or bidirectional communication, involving specific vehicles and specific information, or between the roadside and vehicles, has been accomplished by various schemes. Some schemes include directional antennas, selected radio frequencies, both continuous and pulsed, and signal encoding. Electronic license plates have also been developed for such local communication. Electronic license plates are license plates that provide both visual information as traditional license plates provide, as well as electronic information and communication. The electronic information can be used for automatic vehicle identification for toll collection purposes or for identification of special vehicles, such as buses to improve scheduling, and police cars and ambulances to improve the efficiency of dispatching such vehicles. Highway vehicles can be electronically monitored by law enforcement agencies. Currently, police use license plates to visually identify vehicles. With electronic license plates, police can use the visual information in conjunction with radio frequency interrogation systems to electronically request and receive the same information provided visually by the license plate, as well as other information, such as the validity of required on-board documents, such as insurance, registration or emission certificates. Other uses of systems using the electronic communication capabilities of electronic license plates include automatic restriction of areas to certain vehicles, traffic control, vehicle theft protection, toll collection, collision avoidance and emergency message communication.

One way to provide electronic information in addition to the visual information is to provide an electronic module in a vehicle for electronically communicating with an interrogator. For example, in U.K. Patent Application GB 2,256,072A to Matsushita Electric Industrial Co. Ltd., a road antenna from an automatic vehicle identification system receives, by radio, data from an ID plate which is separate from the license plate and is located inside the vehicle. While having an electronic module separate from the license plate accomplishes the goal of providing both electronic and visual information, it is further desirable to have both integrated into a single unit for ease of installation, the ability to use existing structures on vehicles for installation, to optimize antenna location for low power communication between the roadside and the vehicle and to ensure that the visual and electronic information is consistent.

An example of an integrated electronic license plate wherein both visual and electronic information are provided in a unitary structure is disclosed in U.S. Pat. No. 4,001,822 to Sterzer. The Sterzer electronic license plate has a plurality of layers. The top layer is an electrically non-conductive layer having visual information printed on it where the printing is similar to the printing on a conventional license plate. Behind the top layer are two antenna networks disposed on both sides of a dielectric substrate and another non-conducting layer behind the dielectric substrate. The antenna networks can receive an interrogation signal from a microwave transmitter and transmit an identification signal in response to the interrogation signal. The Sterzer license plate derives a harmonic signal from the interrogation signal and re-radiates the identification signal at the harmonic frequency.

The Sterzer electronic license plate uses a printed circuit antenna array having a plurality of dipoles with a corporate feed interconnecting the dipole elements. Microstrip antennas are metallic patches printed on a thin, grounded dielectric substrate. To transmit an electromagnetic signal, a feed network feeds a RF signal generated by connected external electronics, to the metallic patch which resonates and sets up an electromagnetic field between the patch and the ground plane and radiates electromagnetic energy. Conversely, a microstrip antenna receives a signal when electromagnetic energy radiated from a source strikes the metal patches, induces and electric field at its resonant frequency and transforms it to an electrical signal.

Visual communication of specific motor vehicle identification has long been accomplished by a license plate with a signature of the state and year of registration along with a unique identification number. In the past, the surface of the license plate was painted in a bright color for ease of reading the visual information. The painted surface was a metal plate to allow stamping of the alphanumerics and to provide mechanical rigidity. The optical efficiency of locating and reading license plates, however, has been significantly enhanced by use of an optically retroreflective surface such as 3M brand Scotchlite™ Reflective License Plate Sheeting, manufactured by Minnesota Mining and Manufacturing Company of St. Paul, Minn., and printed with the appropriate vehicle designation. The enclosed lens retroreflective surface is a composite material having a monolayer of microspheres, such as glass beads, embedded in a matrix of resin material for positioning, physical integrity and protection and having a reflective coating underlying and spaced from the glass beads. The space coat is made up of an array of connected hemispheres with the substantially continuous metal reflective coating, preferably vapor deposited aluminum, underlying the space coat. The glass bead and reflective surface coating construction provides for reflection of incident light, such as an automobile headlight, to be reflected back at the source, thereby making the surface very visible and readable. The retroreflective construction is then laminated to a metal, usually aluminum, substrate for mechanical stability and for mounting the license plate.

It is well known that the transmission of radio signals is distorted, if not completely inhibited, when an interposing conductive plane is placed in the path between a transmitter and receiver. An interposing conductive plane closely located to a microstrip antenna renders the antenna ineffective for the frequency it was designed for because it detunes the operational frequency of the antenna thereby preventing the antenna from resonating at the antenna's operational or resonant frequency. Also, the radiating field radiates into the interposing conductive layer rather than out into the preferred direction. The conductive layer then converts the energy into an electrical signal and reradiates the energy, resulting in a distorted field pattern and loss of the desired directionality and gain.

In prior art integrated electronic license plates, the visual layer of the license plate had a painted visual surface to aid optical reading of the vehicle's information. The retroreflective sheeting used with traditional license plates could not be used because its continuous vapor coat layer acted as an interposing conductive plane when placed on the surface of the electronic license plate, such as if placed on the first planar member of the Sterzer electronic license plate. The continuous vapor coat layer would have distorted or blocked the fields radiated from the antenna network and rendered the antenna network behind the retroreflective sheeting ineffective for communication. Therefore, what is desirable is an integrated electronic license plate capable of electromagnetic communication and having a retroreflective surface for improved optical visibility.

Similar to electronic license plates, electronic road signs have been developed for unidirectional or bidirectional communication between vehicles and the roadside, such as for in-vehicle signing. An electronic road sign has a surface with printed visual information for visual communication of desired information, such as toll collection, traffic control information or dangerous condition warnings. The electronic road sign also has a transmitter to electronically transmit information associated with the road sign. In-vehicle signing allows a vehicle on the roadway to electronically receive the information from the roadside transmitter and display the information inside the vehicle. Also, the information can be communicated by audio within the vehicle. The electronic road sign may also have a receiver to receive information from the vehicle, such as in toll collection to verify transactions, or from traffic management centers to update the message information to be delivered to a vehicle.

Electronic road signs are desirable because they effectively communicate information to vehicles in situations where visibility between the vehicle and the road sign is poor. The electronic road sign can provide redundant information to ensure the driver of a vehicle receives the information. For example, German Patent Application DE 41 42 091 A1 to Siemens Matsushita Components, filed Aug. 5, 1993, describes an identification system for recognizing traffic information in vehicles, where an active transponder is placed inside a vehicle and a passive transponder is provided near a traffic sign, such as under the sign and mounted on the same post. What is further desirable is a retroreflective electronic road sign that enhances the optical visibility of the road sign, further improving the communication of information. Even more desirable is a integrated retroreflective electronic road sign. While a separate antenna may be placed alongside a road sign, or on the same mounting as a road sign, it is preferable to integrate the antenna or receiver with the road sign to prevent sign congestion on the road side, to be able to use existing infrastructure to implement the electronic road signs, for ease of installation, to reduce cost and for safety considerations.

SUMMARY OF THE INVENTION

To overcome the limitations in the prior art described above, and to overcome other limitations that will become apparent upon reading and understanding the present specification, the present invention provides an integrated retroreflective electronic license plate and an integrated retroreflective road sign that may be used in electronic vehicular identification and communication systems as well as in vehicle to roadside communication systems. The integrated retroreflective electronic license plate has printed visual information for visual communication of information similar to the information on traditional license plates. The printed visual information is printed on retroreflective sheeting, thereby improving the optical efficiency of locating and visually reading the information on the license plate.

To communicate information electromagnetically, an antenna network is integrated with the retroreflective visual portion of the electronic license plate. Because traditional license plate retroreflective sheeting occludes radiation from antennas placed within prior art electronic license plates, the present invention discloses embodiments wherein retroreflective sheeting will not occlude the radiating elements of the antenna networks. For example, different types of antennas may be used to avoid the continuous conductive reflective layer of the retroreflective sheeting, new types of retroreflective sheeting may be utilized that are not opaque to electromagnetic radiation, and the continuous conductive reflective layer of the retroreflective sheeting may be used as the ground plane for the antenna network.

BRIEF DESCRIPTION OF THE DRAWINGS

The present invention will be more fully described with reference to the accompanying drawings wherein like reference numerals identify corresponding components, and.

DETAILED DESCRIPTION OF THE PREFERRED EMBODIMENT

In the following detailed description of the preferred embodiment, reference is made to the accompanying drawings which form a part hereof, and in which is shown by way of illustration of a specific embodiment of which the invention may be practiced. It is to be understood that other embodiments may be utilized and structural changes may be made without departing from the scope of the present invention.

Figures 1, 1A, 1B:
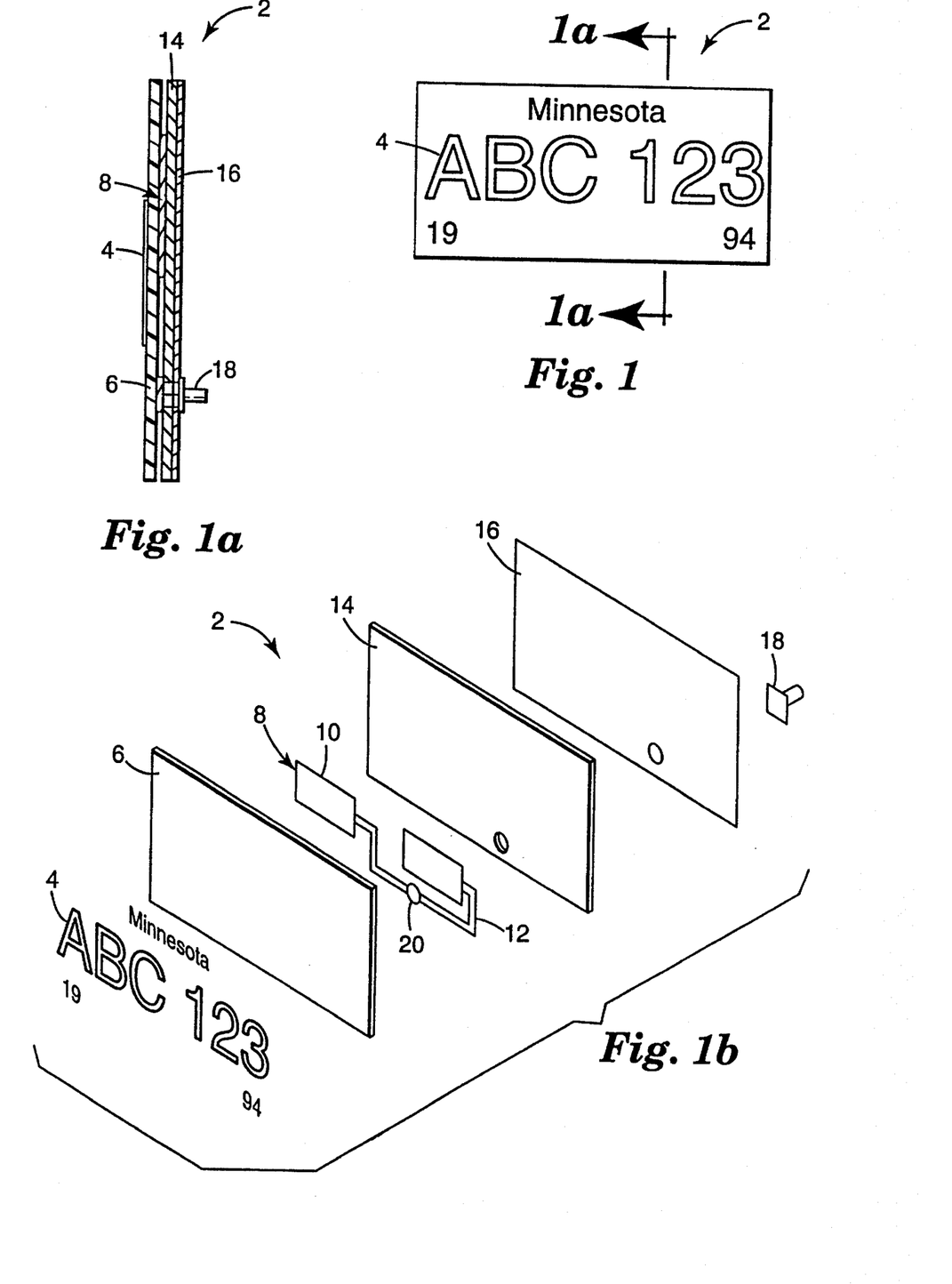
FIGS. 1, 1a and 1b show a front, a cross-sectional and an exploded view of a first embodiment of an integrated retroreflective electronic license plate of the present invention.

Referring to FIG. 1, a front view of an integrated retroreflective electronic license plate is shown. Electronic license plate 2 has printed visual information 4 similar to traditional license plates. The printed visual information may include information such as the state in which the automobile is registered, a unique identification number assigned to the automobile and the year of registration. Printed information 4 may by painted on the license plate and may also be embossed into the license plate.

Figure 2:
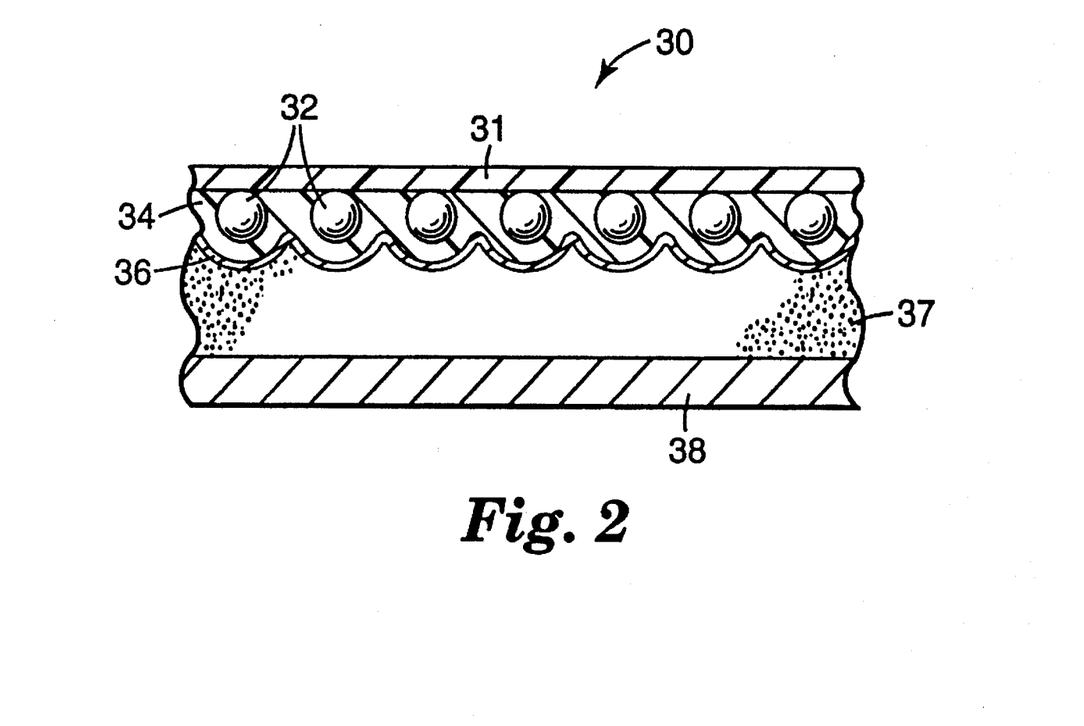
FIG. 2 is a cross-sectional view of retroreflective sheeting with a continuous reflective coating layer.

FIG. 1a is a side cross-sectional view and FIG. 1b is an exploded view of the integrated retroreflective electronic license plate of FIG. 1. Printed information 4 is placed on the front side of retroreflective sheeting 6. Retroreflective sheeting 6 cannot be the type of retroreflective sheeting typically used with traditional license plates. A cross-sectional view of the type of retroreflective sheeting typically used is shown in FIG. 2. Enclosed lens retroreflective sheeting 30 employs a monolayer of microspheres 32, typically glass beads, embedded in binder layer 34 with transparent cover film 31. Underlying and spaced from binder layer 34 is substantially continuous reflective coating 36. A polymeric spacing layer may be provided between binder layer 34 and reflective coating 36 to provide a uniform layer of spacing, the space coat having an array of connected hemispheres. Continuous reflective coating 36 is preferably vapor deposited aluminum. Substantially continuous reflective metal coating 36 acts as a conductive plane. Reflective coating 36 would render any antenna network placed behind it ineffective for communication if used in an electronic license plate. Adhesive layer 37 may be included with removable paper liner 38 for bonding retroreflective sheeting 30 to any surface, although usually a metal substrate.

Figure 3:
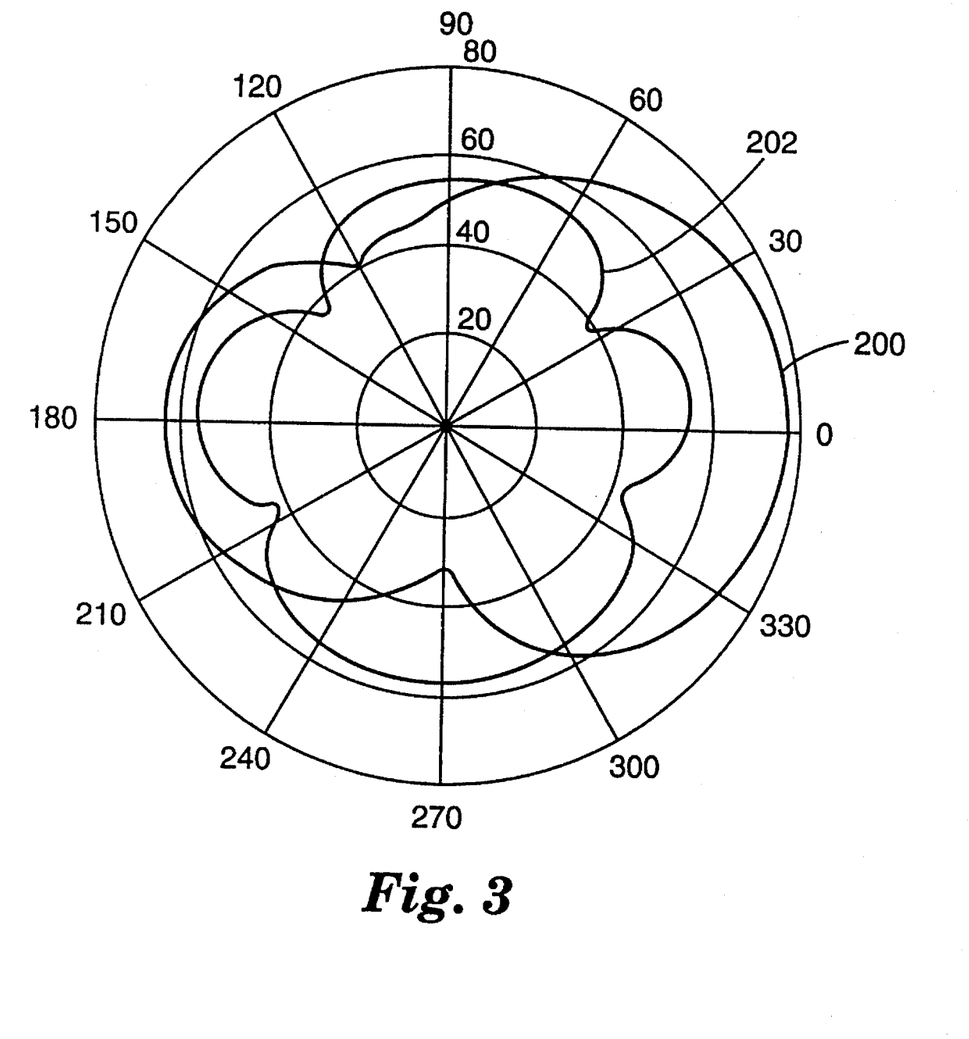
FIG. 3 shows antenna patterns for an uninhibited antenna and for the same antenna with retroreflective sheeting with a continuous reflective coating layer placed in front of it.

Referring to FIG. 3, antenna patterns are shown for a pair of microstrip patch antennas operating at a resonant frequency of 915 MHz. Antenna pattern 200 is an antenna pattern with no layer in front of the antenna network. Antenna pattern 200 is a desirable pattern for a directional antenna, as the pattern is strongest broadside and weaker on all other sides. Antenna pattern 202 is an antenna pattern with retroreflective reflective sheeting traditionally used on license plates placed in front of the microstrip antenna network. The continuous metallic vapor coat layer of the retroreflective sheeting absorbs and reflects the radiation from the microstrip antenna and reradiates it off the edges of the vapor coat. Further, the vapor coat layer detunes the antenna. The entire antenna pattern is distorted, thereby rendering it ineffective as a directional antenna.

Figure 4:
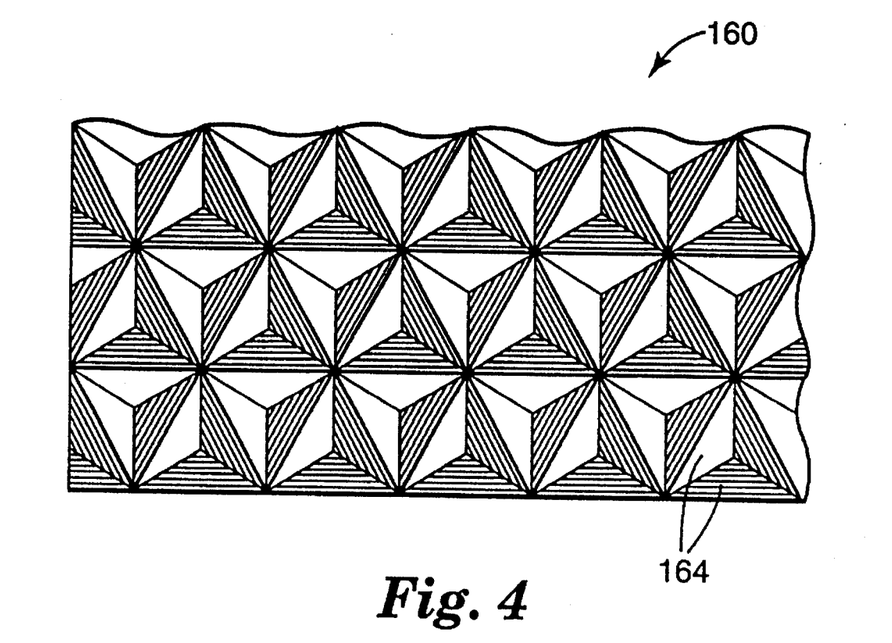
FIG. 4 and 4a show a top and a cross-sectional view of cube-corner retroreflective sheeting.
Figure 4A:
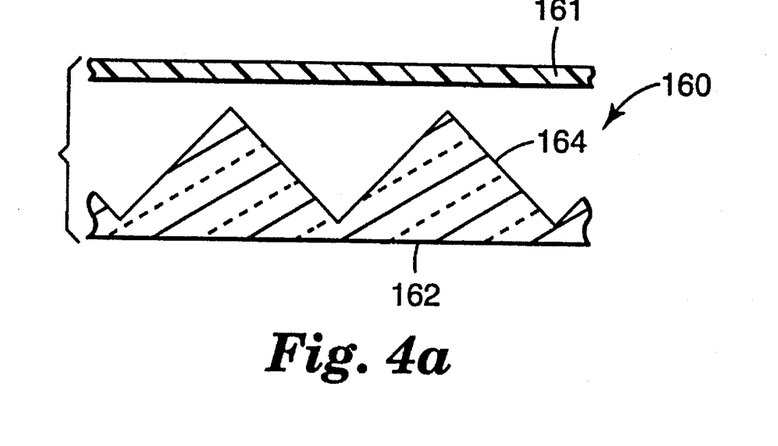
Figure 5:
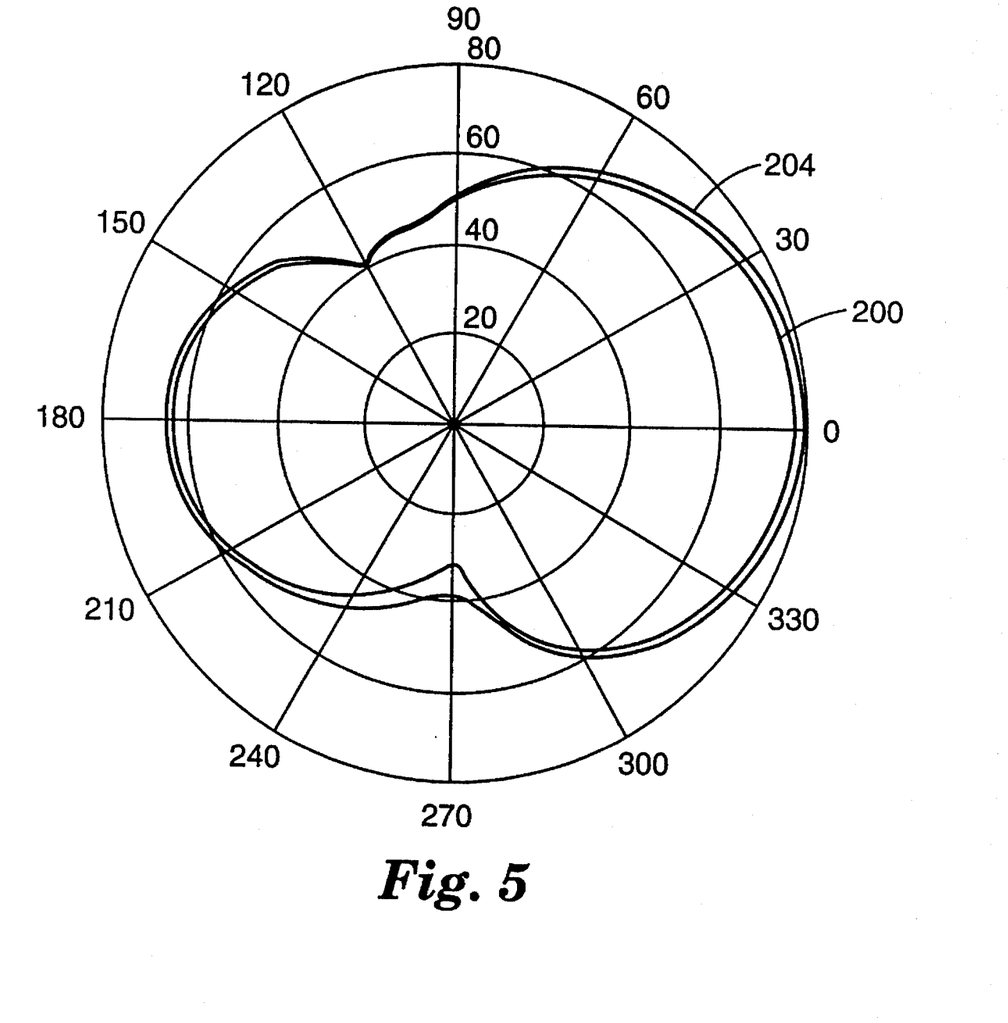
FIG. 5 shows antenna patterns for an uninhibited antenna and for the same antenna with cube-corner retroreflective sheeting placed in front of it.

A high efficiency prismatic retroreflective sheeting has been developed by Minnesota Mining and Manufacturing Company, St. Paul, Minn., that provides total internal reflection of light rays within a clear dielectric material. This retroreflective sheeting requires no reflective coating. Referring to FIGS. 4 and 4a, a top view and a cross-sectional view of the retroreflective sheeting is shown. Retroreflective sheeting 160 has first substantially flat side 162 and second side 164 with an array of cube-corner elements thereon. Sealing film 161 may be included to protect the optics of the cube-corner elements. Alternatively, the cube-corner elements may be vapor coated, thereby giving retroreflective sheeting 160 a conductive plane similar to enclosed lens retroreflective sheeting. An example of prismatic retroreflective sheeting is 3M brand Scotchlite™ Reflective Sheeting Diamond Grade. Another example is described in commonly-assigned U.S. Pat. No. 4,588,258 to Hoopman issued May 13, 1986. Because the cube-corner retroreflective sheeting utilizes a dielectric material, it may be used as retroreflective sheeting 6 of electronic license plate 2 because it may be placed in front of an antenna network without inhibiting the transmission of the radio signals. FIG. 5 shows antenna patterns for a pair of microstrip patch antennas operating at a resonant frequency of 915 MHz. Antenna pattern 200 is an uninhibited antenna network, having no structure in front of it. Antenna pattern 204 is the same antenna network with cube-corner retroreflective sheeting placed in front of it. Antenna pattern 204 essentially has no degradation of the pattern, and is still effective as a directional antenna for communication.

Figure 6:
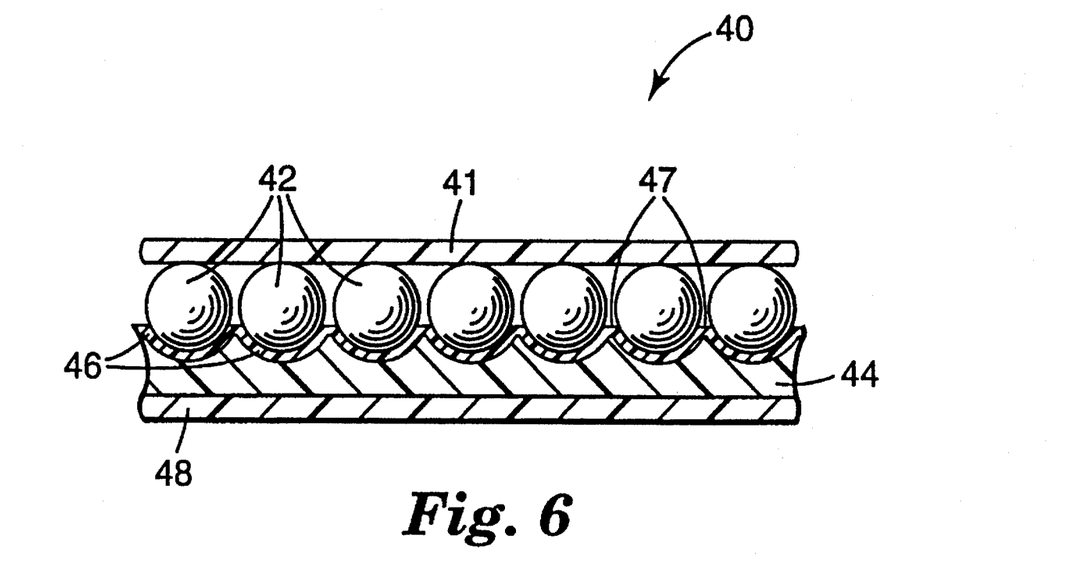
FIG. 6 is a cross-sectional view of retroreflective sheeting with a discontinuous reflective coating layer.

An encapsulated lens type of retroreflective sheeting, such as 3M brand Scotchlite™ Reflective Sheeting High Intensity Grade, manufactured by Minnesota Mining and Manufacturing Company, may be used as retroreflective sheeting 6 of electronic license plate 2. Referring to FIG. 6, a cross-sectional view of such sheeting is shown. Retroreflective sheeting 40 has a monolayer of microspheres 42, such as glass beads, partially embedded in support layer 44 of binder material. Substantially hemispherical reflective coating 46 underlies and is in optical connection with the embedded surface of each microsphere 42. Reflective coating 46 is preferably vapor deposited aluminum. Gaps 47 exist between each substantially hemispherical reflective coating 46 of each microsphere 42, thereby forming a discontinuous vapor coat layer. The size of gaps 47 varies depending on the placement of microspheres 42 and distances therebetween. Further, support film 48 may be included. Microspheres 42 may be encapsulated and hermetically sealed in pockets made up of top film 41 and sealing legs, not shown, the pockets optically exposed to an air interface. Examples of such retroreflective sheeting are described in commonly-assigned U.S. Pat. No. 3,190,178 to McKenzie issued Jun. 22, 1965, and U.S. Pat. No. 4,664,966 to Bailey et al. issued May 12, 1987.

Figure 7:
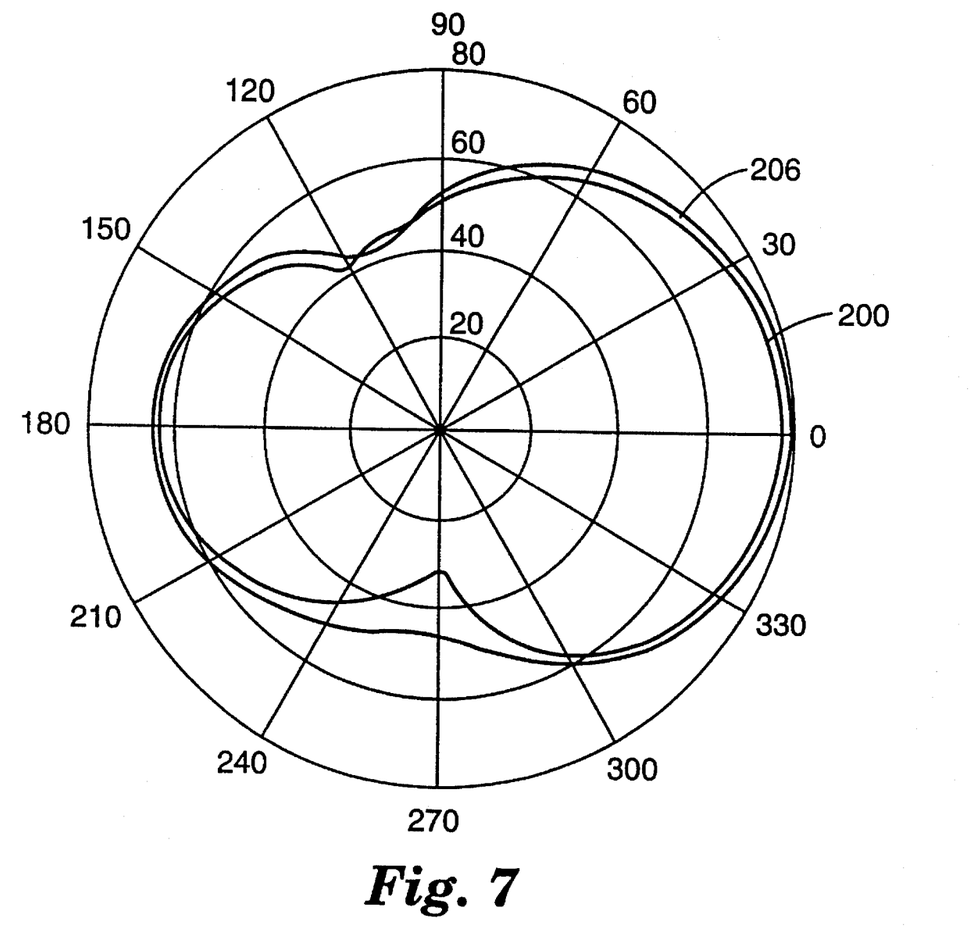
FIG. 7 shows antenna patterns for an uninhibited antenna and for the same antenna with retroreflective sheeting with a discontinuous reflective coating layer placed in front of it.

FIG. 7 shows antenna patterns for a pair of microstrip antennas operating at a resonant frequency of 915 MHz. Again, antenna pattern 200 is an uninhibited antenna network. Antenna pattern 206 is the same antenna network with retroreflective sheeting with a discontinuous vapor coat layer in front of it. As seen in FIG. 7, there is essentially no degradation in the antenna pattern, allowing the antenna network to still be effective as a directional antenna. This is surprising because the vapor coat layer comprises approximately 70% metal. Despite the metallic layer, the discontinuity of the vapor coat layer allows the retroreflective sheeting to be used with antennas of frequencies consistent with the structure of the hemispherical reflective coating. As seen in FIG. 6, because the metallic reflective coating is behind each microsphere 42, as long as each hemispherical reflective coating 46 is small with respect to the wavelength of the signal and the distance between microspheres 42 is large enough, essentially no degradation exists. In this situation, some energy is scattered by the metal but most of the energy passes through the discontinuous vapor coat layer.

Referring again to FIG. 1b, radiating elements 10 of antenna network 8 may be etched, printed, laminated, as well as other standard techniques, onto dielectric substrate 14. Also, radiating elements 10 may be etched or printed on a thin substrate and laminated onto a thicker dielectric layer, such that dielectric substrate 14 is made up of two layers. The metallization layer on the dielectric is preferably copper, but may be any conductive metal. Many suitable materials may be used for dielectric substrate 14. In a preferred embodiment at a resonant frequency of 915 MHz, radiating elements 10 are two rectangular microstrip patches connected to microstrip feed line 12 of antenna network 8. The dimensions of the patch antennas depend on the chosen frequency as well as the dielectric constant of the substrate and the substrate's thickness. For example, for a resonant frequency of 915 MHz, the patch width would be 7.62 cm and the patch length would be 10.31 cm on Rogers Duroid 5880, having a dielectric constant of 2.2 and a thickness of 0.32 cm. Dielectric substrate 14 is attached to ground plane 16.

Radiating elements 10 can continuously transmit from a vehicle and a roadside system can tune into the transmitted signal and decode it. Conversely, a road side system can send an interrogation signal, which is received by radiating elements 10. The signal can be sent to an electronic module connected to the antenna by connector 18. The electronic module can decode the information and feed a new signal to radiating elements 10 which then can transmit the new signal in response to the interrogation signal.

A simple feed network is used for antenna network 8 to feed radiating elements 10. Connector 18 is a coaxial connector, with its center wire electrically connected to feed point 20 of microstrip feed line 12 and grounded on ground plane 16. Thus, any external electronic module may be connected to electronic license plate 2 through connector 18. For example, the electronic license plate may be coupled to a power source for the antenna. Also, the antenna can be coupled to some memory to retrieve or store received information, or may be coupled to a processor for processing received information. The external modules may be integrated with the electronic license plate or may exist as a stand alone module somewhere else on or within the vehicle.

Figure 8:
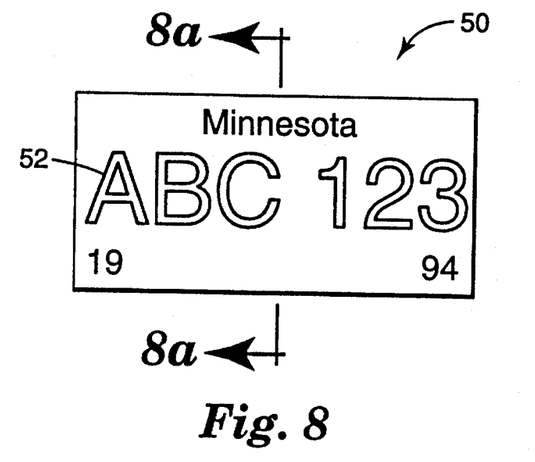
FIGS. 8, 8a and 8b show a front, a cross-sectional and an exploded view of a second embodiment of an integrated retroreflective electronic license plate of the present invention.
Figure 8A:
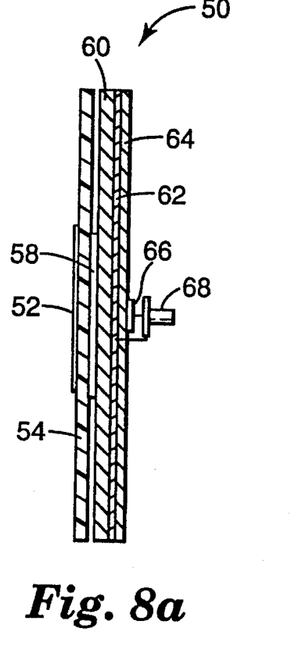
Figure 8B:
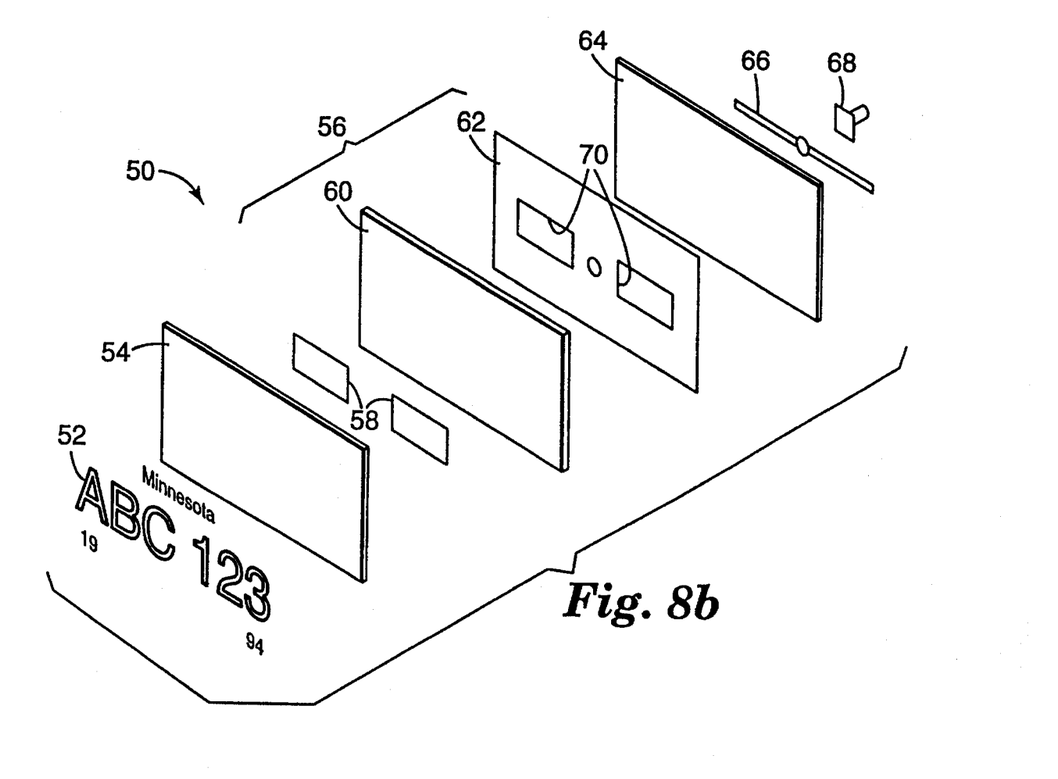

Referring to FIGS. 8, 8a and 8b, another embodiment of the present invention is shown. Retroreflective electronic license plate 50 has printed information 52 placed on retroreflective sheeting 54. In a preferred embodiment, retroreflective sheeting 54 may be an encapsulated lens type retroreflective sheeting or a prismatic type retroreflective sheeting such as those previously described. Antenna 56 includes rectangular microstrip patch antennas 58, dielectric substrate 60 and ground plane 62. In a preferred embodiment, two rectangular microstrip patch antennas 58, etched on dielectric substrate 60 and mounted on ground plane 62, are secured to retroreflective sheeting 54, preferably by pressure sensitive adhesive.

The feed structure for the antenna network of FIG. 8b will now be described. The radiating elements 58 of antenna 56 are coupled to microstrip transmission line 66 by aperture coupling. Aperture coupling does not require a direct electrical connection between microstrip patch antennas 58 and transmission line 66. Rather, dielectric substrates 60 and 64 are separated by ground plane 62. Dielectric substrate 60 contains the radiating elements, microstrip patch antennas 58, while dielectric substrate 64 contains transmission line 66. Dielectric substrate 60 preferably is a relatively thick substrate with a low dielectric constant. Dielectric substrate 64, on the other hand, preferably is a thinner substrate with a higher dielectric constant. Apertures 70 are placed in ground plane 62, each aperture 70 aligned between microstrip patch antenna 58 and transmission line 66. Apertures 70 are preferably rectangular slots and sized based on the physical dimensions of antennas 58 and transmission line 66, the material used for dielectric substrates 60, and the frequency. Apertures 70 allow electromagnetic coupling of antennas 58 to transmission line 66. Transmission line 66 preferably has the form of an open circuit stub, placed for optimum coupling, usually centered over the aperture, and extended approximately one-quarter of a wavelength past the aperture. The width of transmission line 66 depends on the material used for dielectric substrate 64, the thickness of substrate 64, as well as matching the characteristic impedance of any external electronic modules and antennas 58. Coaxial connector 68 may be connected to transmission line 66 and grounded on ground plane 62 for ease of connection to external electronic modules.

Figure 9:
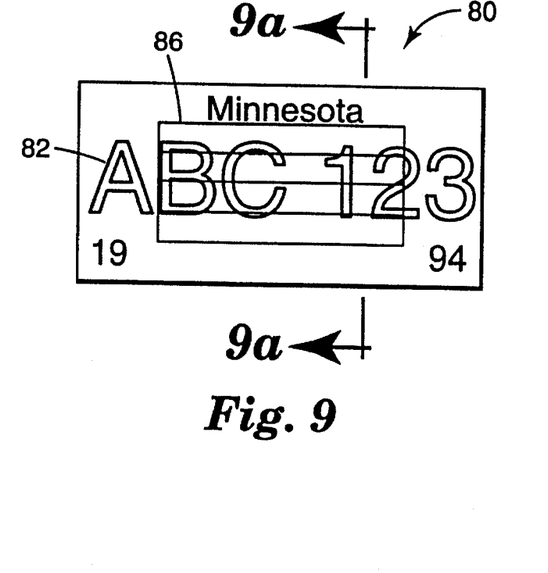
FIGS. 9, 9a and 9b show a front, a cross-sectional and an exploded view of a third embodiment of an integrated retroreflective electronic license plate of the present invention.
Figure 9A:
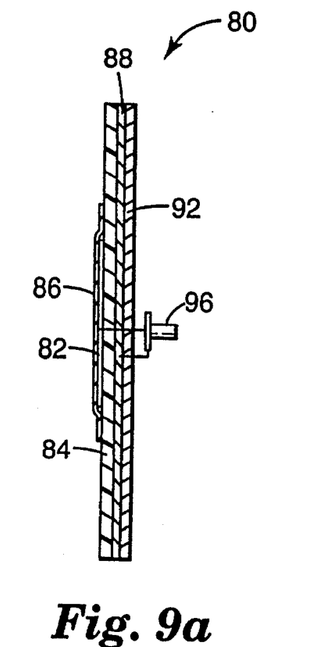
Figure 9B:
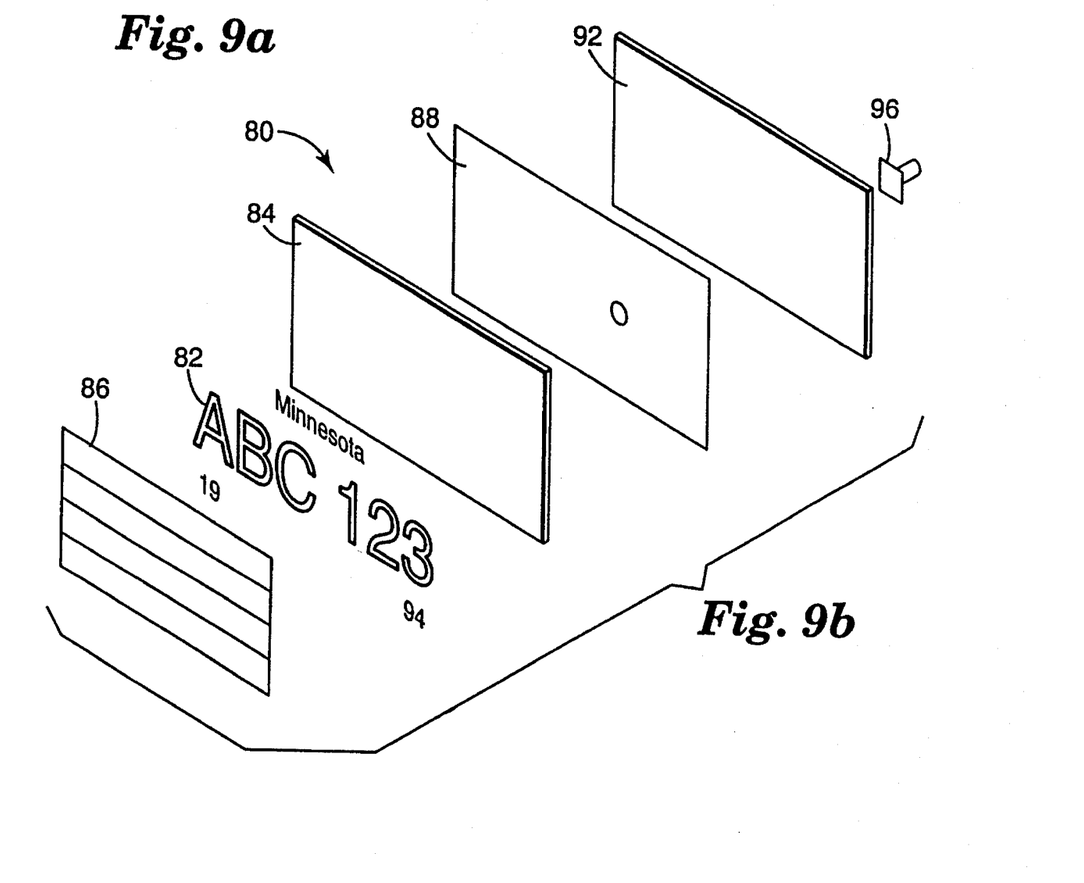

Referring to FIG. 9, 9a and 9b, another embodiment of an integrated retroreflective electronic license plate is shown. Similar to other embodiments of the present invention, printed information 82 is placed on retroreflective sheeting 84. Retroreflective sheeting 84 may be a prismatic type retroreflective sheeting or an encapsulated lens type of retroreflective sheeting similar to those previously described.

In this embodiment of the present invention, the radiating elements of the antenna network are placed on the front of retroreflective sheeting 84. Antennas 86 may be placed either in front of or behind printed information 82. Antennas 86 are transparent or semi-transparent antennas, operating without interference of an interposing retroreflective sheeting. Being semi-transparent, antennas 86 allow at least 50% and preferably at least 75% of light to pass though to retroreflective sheeting 84 and permit incident light to strike retroreflective sheeting 84 and retroreflect back to its source. An example of a semi-transparent radiating element that can be used is described in "Basic Study on See-Through Microstrip Antennas Constructed On a Window Glass," by Wu and Ito in the IEEE Antennas and Propagation Society International Symposium 1992 Digest, vol. 1, pp. 499–502. The Wu and Ito radiating element emulates a microstrip patch, and is placed on a dielectric substrate with a ground plane. The radiating element includes a plurality wires or printed circuit traces, parallel along the length of the resonating element and electrically connected at the ends of the wires. The radiating element emulates a microstrip patch. A microstrip patch is a half-wave resonant element. Wu and Ito parallel a number of half-wave elements and connect them at the ends. The wire spacing varies performance, but always allows light to pass through the radiating element.

Another example of a semi-transparent radiating element is described in "The Wire Grid Microstrip Antenna," by Conti et al. in IEEE Transactions on Antennas and Propagation, Vol. AP-29, No. 1, January 1981. The radiating element consists of an interconnected wire grid structure, the wire grid etched on a dielectric sheet. The length of the antenna, as corresponds to a microstrip antenna, is a half-wavelength. The width of the antenna is one wavelength in the dielectric substrate material. The antenna is fed such that the radiation in the horizontal direction, along the width of the antenna, is destructive, while in the vertical direction it is constructive. Thus, it allows power to be fed to vertical structures with little cross polarization. The grid structure is predominantly open, allowing light to pass through, thereby allowing the retroreflective sheeting to reflect incident light.

Retroreflective sheeting 84 acts as the dielectric necessary for semi-transparent radiating elements 86 and is connected to ground plane 88. While Wu and Ito are concerned with a completely transparent antenna, using a structure similar to the radiating element for the ground plane, it is not necessary to have a semi-transparent ground plane for the present invention. Therefore, a solid ground plane is used to increase the antenna's front-to-back ratio, thereby improving the performance of the antenna. Depending on the frequency, an additional dielectric layer may be combined with the retroreflective dielectric layer such that the dielectric constant or other characteristics are correct for the given frequency. Antennas 86 may be directly fed by a probe feed from coaxial connector 96. Substrate 92 may be included to provide additional structure.

Figure 10:
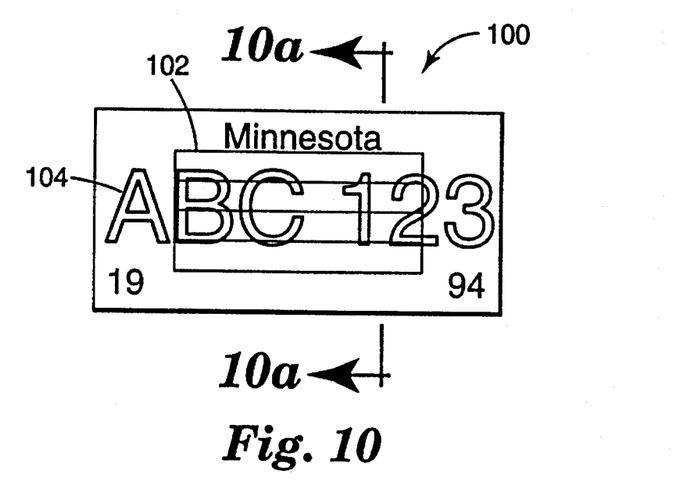
FIGS. 10, 10a and 10b show a front, a cross-sectional and an exploded view of a fourth embodiment of an integrated retroreflective electronic license plate of the present invention.
Figure 10A:
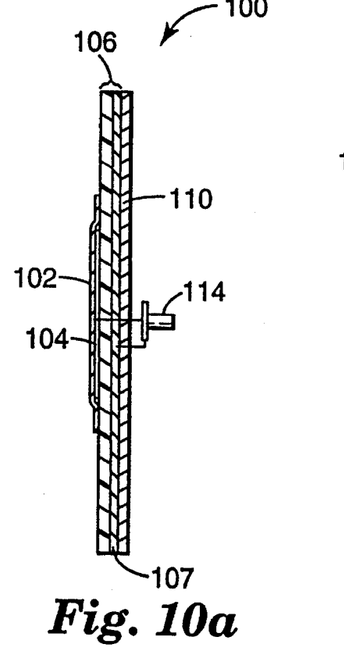
Figure 10B:
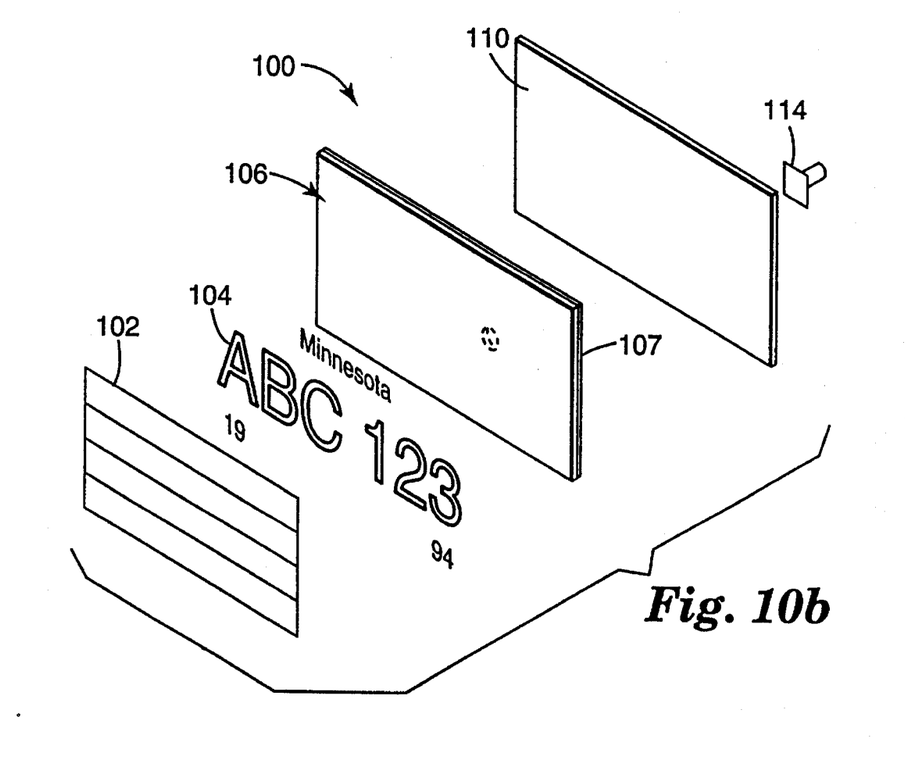

FIGS. 10, 10a and 10b show an embodiment of the present invention similar to the embodiment shown in FIG. 9. Integrated retroreflective electronic license plate 100 also uses transparent or semi-transparent radiating elements 102, either in front of or behind printed information 104, which are fed by coaxial connector 114 for potential connection to external modules. Retroreflective sheeting 106, however, is the enclosed lens type of retroreflective sheeting typically used with traditional license plates. More specifically, retroreflective sheeting 106 has a monolayer of microspheres which are embedded a binder layer with a substantially continuous reflective coating underlying and spaced from the microspheres. The continuous reflective coating is a conductive metal, preferably vapor deposited aluminum. When using retroreflective sheeting 106, such as 3M brand Scotchlite™ Reflective License Plate Sheeting, continuous vapor coat layer 107 acts as the ground plane for semi-transparent radiating elements 102. Therefore, it is not necessary to include a separate ground plane layer within electronic license plate 100. Substrate. 110 may be included to provide additional structure.

Figure 11:
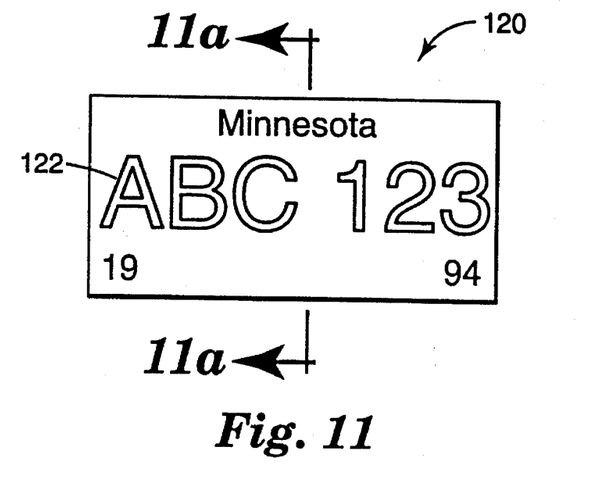
FIGS. 11, 11a and 11b show a front, a cross-sectional and an exploded view of a fifth embodiment of an integrated retroreflective electronic license plate of the present invention.
Figure 11A:
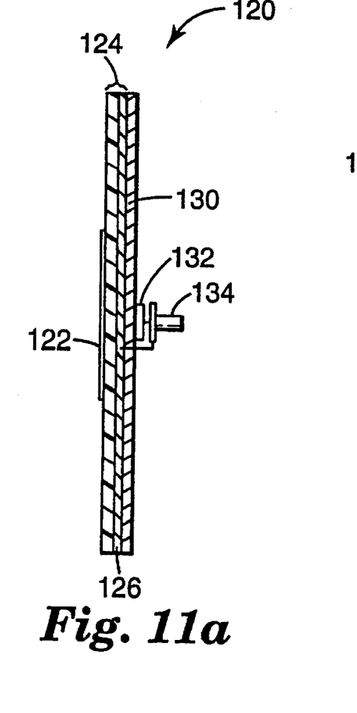
Figure 11B:
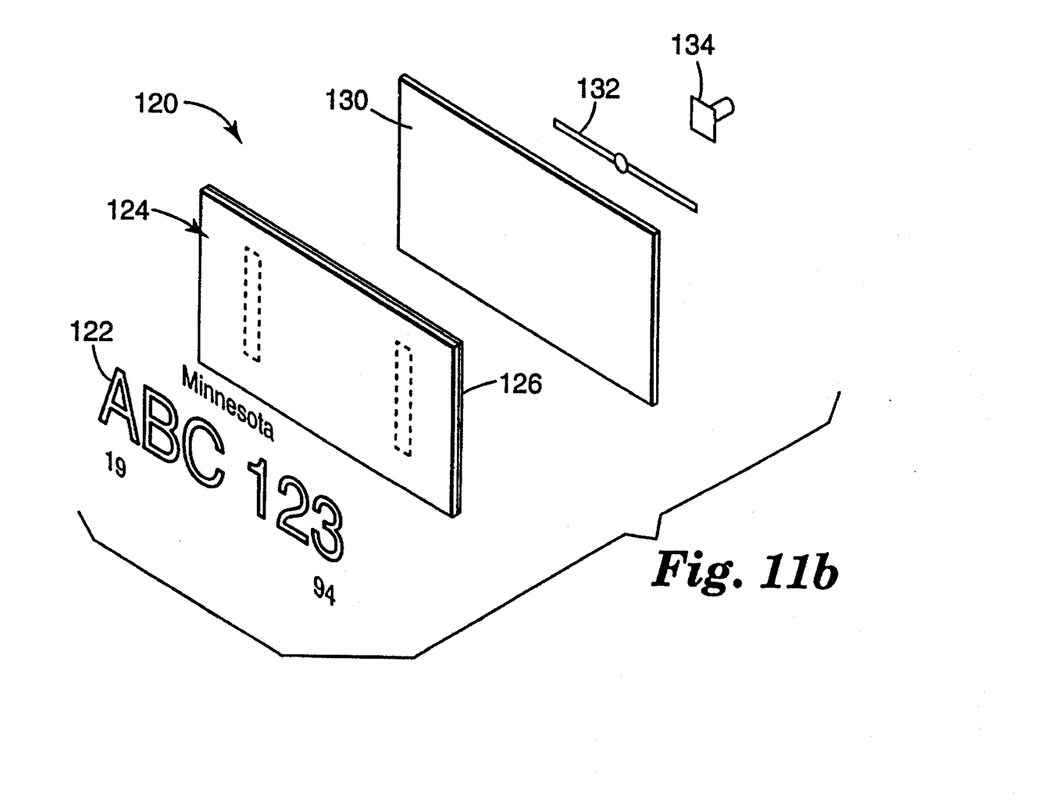

FIGS. 11, 11a and 11b show another embodiment of an integrated electronic license plate with retroreflective sheeting having a substantially continuous conductive reflective coating layer. Retroreflective electronic license plate 120 has printed information 122 placed on retroreflective sheeting 124. Retroreflective sheeting 124 has a monolayer of microspheres which are embedded in binder layer with a substantially continuous reflective coating underlying and spaced from the microspheres. The continuous reflective coating is a conductive metal, preferably vapor deposited aluminum. Electronic license plate 120 utilizes a slot antenna for RF communication. A slot antenna is a slot cut in a ground plane perpendicular to a microstrip transmission line printed on a dielectric substrate. Energy propagating in the transmission line excites the slot and an electromagnetic field is set up between the transmission line and the ground plane. Slots 128 are cut in vapor coat layer 126 of retroreflective sheeting 124 and preferably have a slot length of approximately one-half of a wavelength. The energy is delivered by transmission line 132 which is printed on dielectric substrate 130 and which is terminated in an open circuit. Coaxial connector 134 may be connected to transmission line 132 and grounded on vapor coat layer 126 for ease of connection to external modules.

Figure 12:
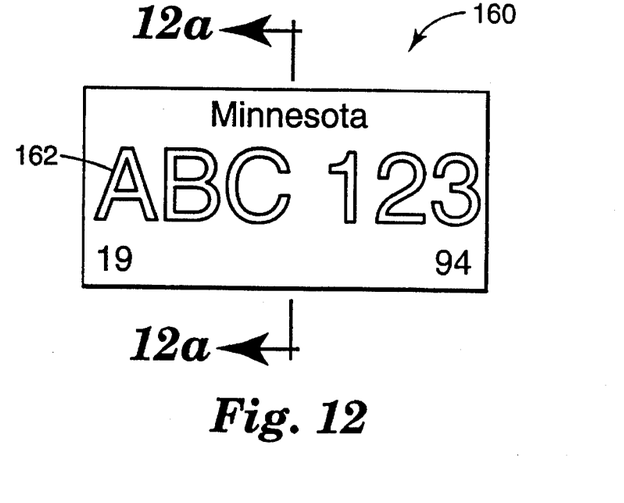
FIGS. 12, 12a and 12b show a front, a cross-sectional and an exploded view of a sixth embodiment of an integrated retroreflective electronic license plate of the present invention.
Figure 12A:
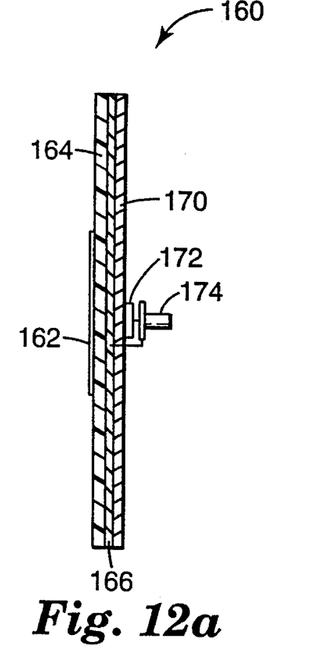
Figure 12B:
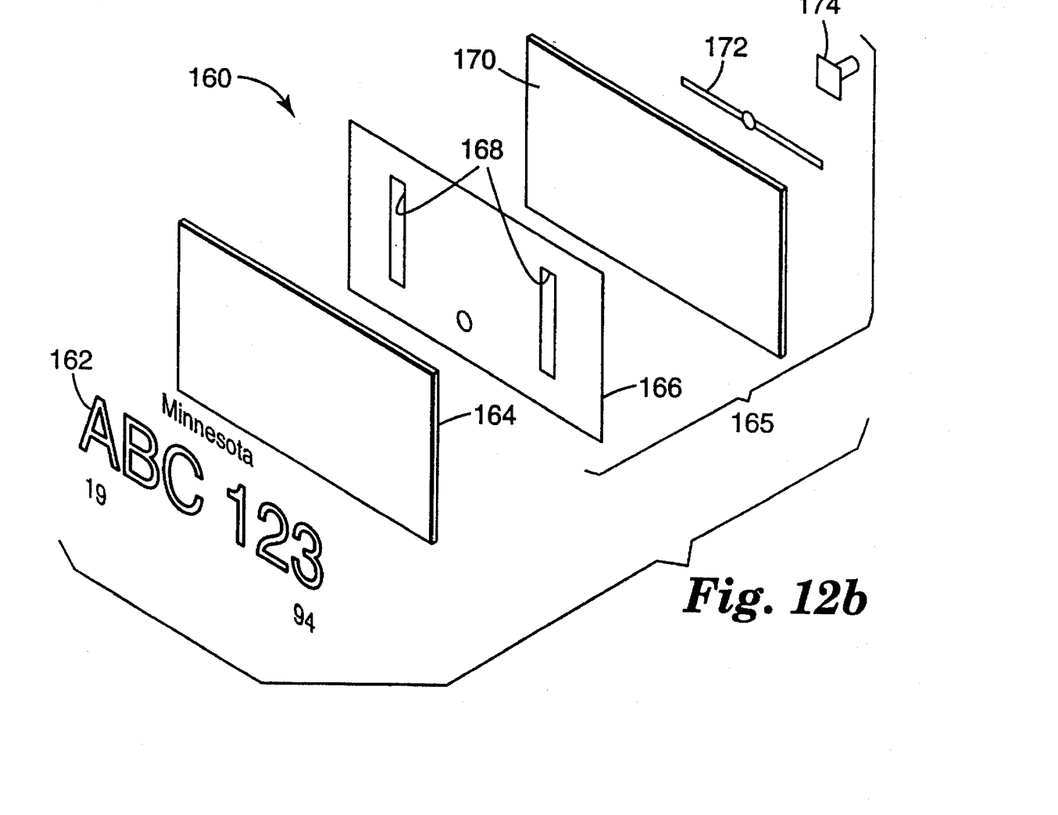

FIGS. 12, 12a and 12b show an embodiment of the present invention similar to the embodiment shown in FIGS. 11, 11a and 11b. Electronic license plate 160 has printed information 162 placed on retroreflective sheeting 164. Retroreflective sheeting 164 is preferably a prismatic type of retroreflective sheeting or an encapsulated lens type of retroreflective sheeting similar to those previously described. Behind retroreflective sheeting 164 is slot antenna 165. Microstrip transmission line 172 is etched on dielectric substrate 170 with ground plane 166. Ground plane 166 has rectangular slots 168 cut in it for radiating electromagnetic energy. Coaxial connector 174 may be connected to transmission line 172 for ease of electrical connection.

Those skilled in the art will readily recognize that integrated electronic road signs can be implemented using the same configurations and materials as the aforementioned embodiments of the integrated retroreflective electronic license plates. For example, in FIGS. 13, 13a, and 13b, integrated retroreflective electronic stop sign 140 is similar to integrated retroreflective electronic license plate 50, as shown in FIGS. 8, 8a and 8b. Printed information 142 is placed on retroreflective sheeting 144. Printed information 142 may convey visual information to drivers of vehicles while retroreflective sheeting enhances the optical visibility of printed information 142. Retroreflective sheeting 142 is preferably a prismatic type of retroreflective sheeting or an encapsulated lens type of retroreflective sheeting similar to those previously described.

Figure 13:
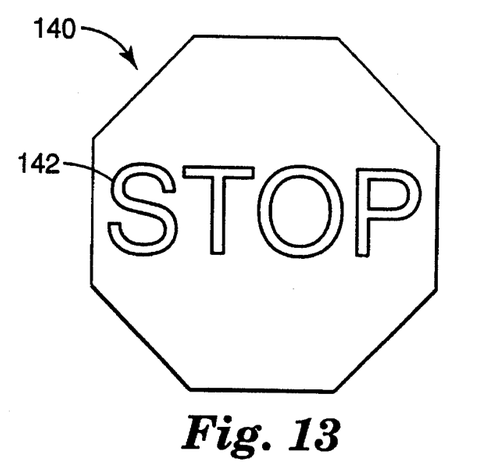
FIGS. 13, 13a and 13b show a front, a cross-sectional and an exploded view of an embodiment of an integrated retroreflective road sign of the present invention.
Figure 13A:
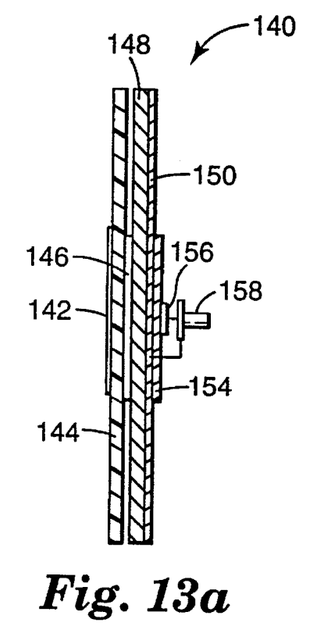
Figure 13B:
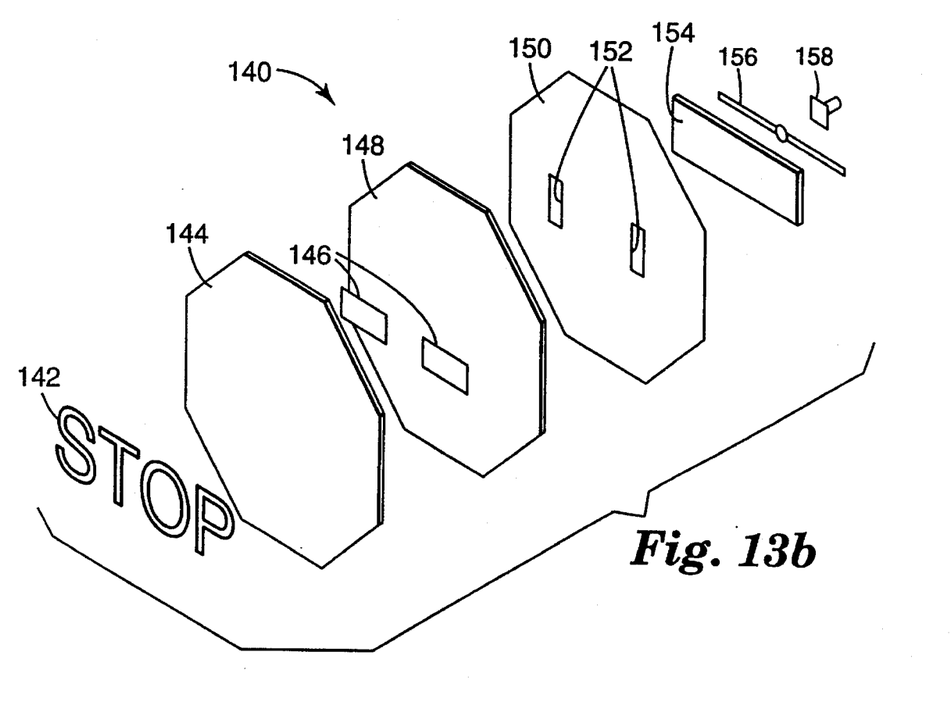

Rectangular microstrip patch antennas 146 are printed on dielectric substrate 148 and spaced from ground plane 150 by dielectric substrate 148. Microstrip antennas 146 are aperture coupled to microstrip transmission line 156. Apertures 152 are placed in ground plane 150 and aligned between microstrip antennas 146 and transmission line 156. Transmission line 156 is printed on dielectric substrate 154. Coaxial connector 158 may be connected to transmission line 156 for ease of connection to external modules. The electronic road sign may be connected to external modules similar to those connected to electronic license plates. Further, the electronic road sign can be connected to a traffic management center.

Although preferred embodiments have been illustrated and described for the present invention, it will be appreciated by those of ordinary skill in the art that any method or apparatus which is calculated to achieve this same purpose may be substituted for the specific configurations and steps shown. It is intended that this covers any adaptations or variations of the present invention. While certain types of antenna networks were described in the preferred embodiments, such as microstrip patch antennas or slot antennas, those skilled in the art will readily recognize that many types of antennas may be utilized behind retroreflective sheeting to accomplish the same effect. For example, dipole antennas, wire antennas or horn antennas could also be used. Those skilled in the art will further recognize that the design of antenna networks may vary, based on various applications requiring different frequencies, beam width, cross-polarization, gain, material properties, directivity, efficiency, and other properties. For example, the number of patches in an array, the feed network and the number of slots may vary based on the application. Therefore, it is manifestly intended that this invention be limited only by the appended claims and the equivalents thereof.

What is claimed is:

1. A retroreflective apparatus for both visual and electromagnetic data communication, said apparatus comprising:

retroreflective means for retroreflecting incident light, said retroreflecting means having visual information thereon;

antenna means for electromagnetic communication; and coupling means for allowing coupling to said antenna means;

wherein said retroreflective apparatus is substantially rigid.

2. The retroreflective apparatus for both visual and electromagnetic data communication according to claim 1, wherein said retroreflective means comprises retroreflective sheeting having first and second faces and wherein said antenna means comprises:

a generally planar dielectric substrate having first and second faces, said first face of said dielectric substrate being disposed in parallel and adjacent said second face of said retroreflective sheeting;

radiating means disposed between said second face of said retroreflective sheeting and said first face of said dielectric substrate for radiating electromagnetic energy; and a generally planar electrically conductive member having a first face and a second face for acting as a ground plane for said radiating means, said first face of said electrically conductive member being disposed in parallel and adjacent said second face of said dielectric substrate.

3. The retroreflective apparatus for both visual and electromagnetic data communication according to claim 2, wherein said retroreflective sheeting comprises:

a base sheet having a monolayer of microspheres which are partially embedded in one of its surfaces, said base sheet having specular light reflecting means underlying and in optical connection with the embedded surface of said microspheres;

a cover sheet disposed in spaced relation from said layer of retroreflective elements; and a network of narrow intersecting bonds extending between said cover sheet and said base sheet.

4. The retroreflective apparatus for both visual and electromagnetic data communication according to claim 3, wherein said specular light reflecting means comprises a substantially hemispherical reflective coating on each microsphere.

5. The retroreflective apparatus for both visual and electromagnetic data communication according to claim 4, wherein said coating is a metal.

6. The retroreflective apparatus for both visual and electromagnetic data communication according to claim 5, wherein said metal is aluminum.

7. The retroreflective apparatus for both visual and electromagnetic data communication according to claim 2, wherein said retroreflective sheeting comprises a sheet having first and second sides, said first side being substantially flat and said second side having an array of cube-corner retroreflective elements thereon.

8. The retroreflective apparatus for both visual and electromagnetic data communication according to claim 2, wherein said radiating means comprises a first microstrip patch.

9. The retroreflective apparatus for both visual and electromagnetic data communication according to claim 8, wherein said coupling means comprises:

a microstrip transmission line connected to said microstrip patch; and a coaxial line connected to said microstrip transmission line.

10. The retroreflective apparatus for both visual and electromagnetic data communication according to claim 8, wherein said coupling means comprises:

a second generally planar dielectric substrate having first and second faces, said first face of said second generally planar dielectric substrate being disposed in parallel and adjacent said second face of said electrically conductive member;

a microstrip transmission line having first and second faces, said first face of said transmission line being disposed in parallel and adjacent said second face of said second generally planar dielectric substrate and aligned with said microstrip patch; and a coaxial line connected to said microstrip transmission line and said electrically conductive member; and said electrically conductive member having an aperture from said first face to said second face, said aperture aligned with said microstrip patch.

11. The retroreflective apparatus for both visual and electromagnetic data communication according to claim 10, wherein an array of microstrip patches includes said first microstrip patch and wherein said electrically conductive member has a plurality of apertures from said first face to said second face, each of said apertures aligned with a corresponding microstrip patch from said array of microstrip patches.

* * * * *